United States Patent [19]

Schweiger

[11] 4,243,487
[45] Jan. 6, 1981

[54] GAS-COOLED HIGH TEMPERATURE NUCLEAR REACTORS

[75] Inventor: Fritz Schweiger, Hagen, Fed. Rep. of Germany

[73] Assignee: Hochtemperatur-Kernkraftwerk GmbH (HKG) Gemeinsames Europäisches Unternehmen, Hamm-Uentrop, Fed. Rep. of Germany

[21] Appl. No.: 899,970

[22] Filed: Apr. 25, 1978

[30] Foreign Application Priority Data

May 3, 1977 [DE] Fed. Rep. of Germany ....... 2719613

[51] Int. Cl.² .............................................. G21C 9/00
[52] U.S. Cl. ................. 176/38; 176/58 PB; 176/60
[58] Field of Search ................. 176/38, 58 PB, 59, 60, 176/84

[56] References Cited

U.S. PATENT DOCUMENTS

| 2,132,757 | 10/1938 | Paulson | 176/84 |
|---|---|---|---|
| 2,929,768 | 3/1960 | Mahlmeister et al. | 176/84 |
| 3,127,322 | 3/1964 | Podd | 176/38 |
| 3,410,752 | 11/1968 | Dell | 176/60 |
| 3,470,066 | 9/1969 | Livsey et al. | 176/60 |
| 3,544,425 | 12/1970 | Shaw et al. | 176/58 |
| 3,775,248 | 11/1973 | Charcharos | 176/60 |
| 3,998,057 | 12/1976 | Haferkamp et al. | 176/60 |

FOREIGN PATENT DOCUMENTS

| 1956226 | 2/1971 | Fed. Rep. of Germany | 176/60 |
|---|---|---|---|
| 2542967 | 3/1977 | Fed. Rep. of Germany | 176/60 |
| 2718493 | 11/1978 | Fed. Rep. of Germany | 176/58 PB |
| 1246760 | 9/1971 | United Kingdom | 176/60 |

*Primary Examiner*—Samuel W. Engle
*Assistant Examiner*—S. A. Cangialosi
*Attorney, Agent, or Firm*—Toren, McGeady and Stanger

[57] ABSTRACT

A gas-cooled, and preferably helium cooled, graphite-moderated high temperature nuclear reactor of the kind having a pressure vessel containing a reactor core with fuel elements, graphite components and a primary coolant gas circuit including a steam generator and coolant gas blowers, has the steam generator disposed outside the pressure vessel and the steam generator includes a heat exchanger at least a portion of which is located above the level of the reactor core. This situation of the heat exchanger ensures that when the reactor is shut down, either intentionally or owing to a fault, a natural convection flow takes place through the coolant gas circuit and this natural convection flow is in the same direction as it is when the blowers are functioning so that the flow conducts away the decay heat from the core to the steam generator in the same way as when the blowers are in operation.

15 Claims, 5 Drawing Figures

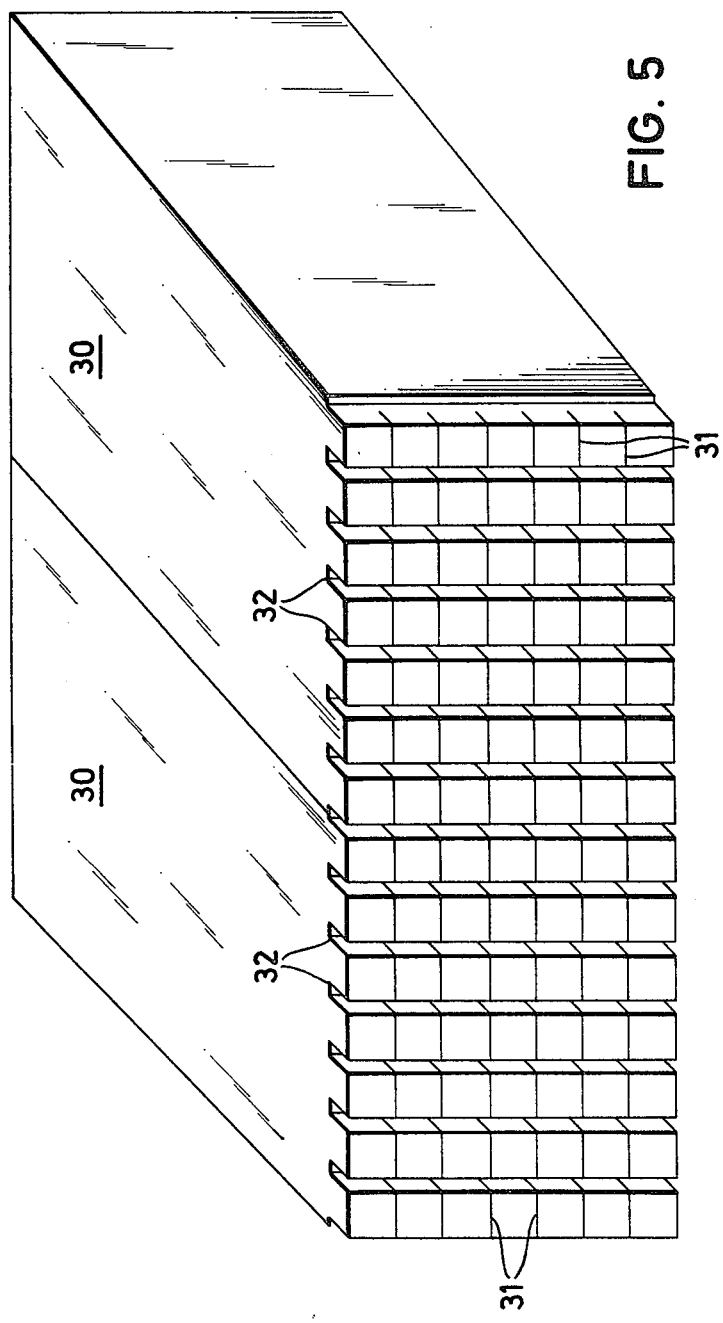

GAS-COOLED HIGH TEMPERATURE NUCLEAR REACTORS

This invention relates to gas-cooled, for example helium-cooled, graphite-moderated high temperature nuclear reactors, comprising fuel elements which are preferably spherical, graphite components and a steam generator and coolant gas blowers provided in a primary coolant gas circuit.

One of the main difficulties during an intentional operational shut-down, a temporary shut-down or an emergency shut-down of a nuclear reactor of this type, consists in the removal of the decay heat produced after shut-down, especially in the region of the maximum neutron flux and consequently the maximum decay heat produced there. This is because with the once-through charging (Otto charging: "once through then out") for the said type of reactor the region of maximum neutron flux is situated in the upper third of the core. To overcome this difficulty, various measures have been proposed over a period of many years but these are not satisfactory in that they involve, firstly a considerable, expensive and scarcely acceptable complication of auxiliary devices, and secondly necessitate long shut-down times.

By using special characteristics of the type of reactor with which the invention is concerned the present Applicants have however already proposed measures by which a remedy to the aforementioned difficulty can be obtained in a surprisingly simple manner. Reference is made here to British specifications No. 1,435,062 and German specification Nos. 2,264,947 and 2,265,032. These proposals are based upon the concept of incorporating the negative temperature coefficient of reactivity as a determining influencing variable into the shut-down procedure.

The aim of the present invention is to provide measures, which make expensive additional installations for the shut-down operation superfluous and, in particular, also permit the aforementioned concept for the shutting down to be carried out in a still more simple manner, both for emergency cases and also in the normal course of operation.

To this end, according to this invention, in a gas-cooled, graphite-moderated high temperature nuclear reactor comprising a pressure vessel containing a reactor core comprising fuel elements, graphite components and a primary coolant gas circuit including a steam generator and coolant gas blowers, the steam generator is disposed outside the pressure vessel and includes a heat exchanger at least a portion of which is located above the level of the reactor core.

The concept underlying the invention therefore is to generate a natural convection flow starting from the heat exchangers, this convection flow having the same direction in the heat exchangers as the coolant gas when the blowers are operating. This natural convection flow initated by the heat exchangers is opposed by the static draught of the gas column in the reactor core. Here, an "internal" circulation of the coolant gas in the reactor core, which will be described later, facilitates the forcing through of the natural convection initiated by an evaporator in the cooler part of the reactor core, that is in an annular region at the internal surface of a side reflector of the core. The simple measures in accordance with the invention lead to the surprising result that the heat removed at the wall of the reactor core by the convective natural circulation, which becomes established in the core after shut-down, is conducted away by natural draught out of the external convection annular space of the reactor core.

In an advantageous and surprising manner the possibility is therefore created, after shut-down of the blowers, of ensuring a natural convection without reversal of the flow direction of the coolant gas. The avoidance of the reversal of the flow direction of the coolant gas has the special advantage that the cold gas duct is kept clear of the hot gas, for which purpose it was hitherto necessary, if the blowers failed, for appropriate valves to be closed in order to avoid a reversal of flow. With the arrangement in accordance with the invention, natural circulation and natural draught (chimney effect) thus assist one another in a surprisingly advantageous manner.

If a low overall height is desired as far as possible, then at least a portion of a first economiser tube packet is incorporated in an outer annular space of the steam generator, through which the flow, during operation of the reactor, is downwards. This causes an increase in the temperature difference between the upwardly and downwardly flowing gas columns in the steam generator, so that by this means a sufficiently intense natural convection can be attained in the entire primary coolant system.

Particularly good results are achieved if a side reflector of the core, which preferably consists of graphite, is composed of blocks, which preferably extend radially through the entire reflector wall thickness, comprise recesses in the inner end faces at least of the blocks in the upper region of the reactor core. Thus, the measures proposed in our earlier German Application No. P 26 43 275, by which optimum temperature and flow conditions can be achieved in the reactor core, prove to be advantageous if incorporated to amplify the construction in accordance with the invention and to intensify in their actions the effects aimed at by the invention.

The particular advantages of the present invention are to be seen in the fact that no special safety engineering measures are necessary for shut-down. In particular, valves in the coolant system can safely be left open, although to avoid excessive cooling down, the valves should preferably be closed somewhat but not entirely, an adjustment which can be made according to the heat to be removed. This intentional, partial throttling constitutes the sole operating measure.

The possibility of retaining the operational direction of flow of the coolant gas even when there is only natural convection in the primary system fundamentally influences the entire safety concept, in both its operational and its safety aspects, without, as already mentioned, necessitating special devices of additional measures for this purpose. This possibility means that, at normal coolant gas pressure, the following advantages result:

The transportation of the decay heat from the reactor core to the steam generators is positively ensured by natural convection. The provision of driving power and also lubricating oil and cooling water for the coolant gas blowers is no longer a necessity for safety. The hot gas temperature upstream of the steam generators will fall, after shutting down of the blowers, due to mixing occurring in the outer wall of the reactor core between the gas flows from the two natural convection circuits (i.e. the "inner" circuit inside the reactor core and the "outer" superimposed circuit in the primary coolant system), which can provide the great advantage that the cooling of a reheat superheater tube bundle can be dispensed with.

The mean temperature of the reactor core can be kept practically constant at operating temperature by throttling of the outer convection circuit by means of the coolant gas shut-off valves of the blowers.

The coolant gas shut-off valves have no safety engineering importance but only operational importance and are open during operation. This position is also the position required for the safety aspects, so that the valves are now only needed for starting up the blowers against the closed valves and for possible throttling of natural convection in order to maintain the temperature of the reactor core constant or at a desired level.

The quantity of feed water and thus the rating of the feed water pumps can be reduced to a minimum. Since in a reactor with an electrical output of 1200 MW only about 30 MW needs to be removed as decay heat, the evaporation of 50 tonnes of water per hour against atmospheric pressure is sufficient for this purpose. (For comparison: a standard fire brigade fire engine delivers 96 tonnes per hour against a head of 80 m of water).

The tube packets of the steam generators themselves are also not absolutely essential for removing the decay heat, because a removal of heat through the wall of the steel pressure vessel of the steam generators by sprinkling the vessels or by flooding the building with water is possible. The latter can be done without great expenditure, if these measures are planned in advance.

But even if the coolant gas pressure is reduced to 1 bar, the construction in accordance with the invention still afford sufficient safety. In this case, the valves are not operated at all, i.e. they are not throttled but left open, in order to utilise the natural convection produced even at 1 bar and thus to gain time for countermeasures, which for example may consist in connecting up mobile emergency blower power units or carrying out the measure of spraying in water, likewise already proposed in our German Application No. P 25 16 123, if, contrary to expectation, a mobile power unit is not sufficient for operating the blowers. However, at 1 bar less than 1000 kW are required, so that a mobile power unit which is conventional in the energy supply industry with a rating of 2000 kW can, in frequency start-up, operate a blower for the type of reactor with which the invention is concerned.

Two examples of nuclear reactors in accordance with the invention will now be described with reference to the accompanying highly diagrammatic drawings, in which.

Figure 1:
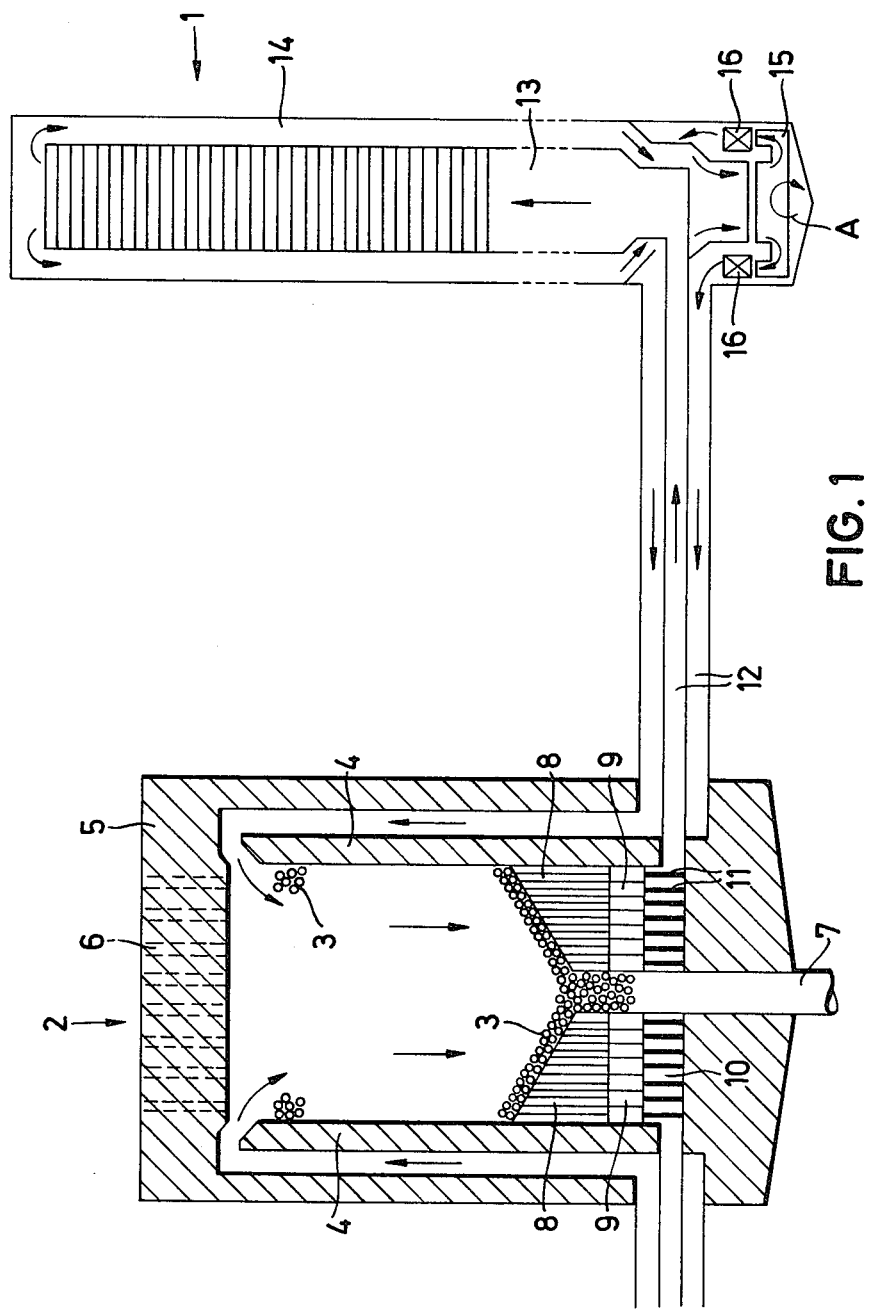
FIG. 1 shows the primary coolant circuit of one example of the reactor in normal operation, i.e. with the coolant gas blowers running.

As shown in FIG. 1, a primary coolant circuit of the reactor is so constructed that a steam generator 1 is not integrated into the pressure vessel of the nuclear reactor 2 but is mounted separately from it. The actual reactor core is formed of a bed of spherical fuel elements 3, which are situated inside a reflector 4, formed of graphite blocks, and are supplied through tubes 6 provided in a top reflector 5 and are removed through a central extraction duct 7 provided in a bottom reflector.

In the bottom reflector, there are vertical coolant gas slits 8, uniformly distributed across its entire cross-section. These slits continue downwards into vertical coolant gas ducts 9 of carbon. The coolant gas ducts 9 are staggered horizontally with respect to the coolant gas slits 8 for reasons of shielding. In this way, no radiation can pass directly downwards into a hot gas collector plenum 10 situated below the coolant gas ducts 9 and in which the support columns 11 are provided.

Figure 2:
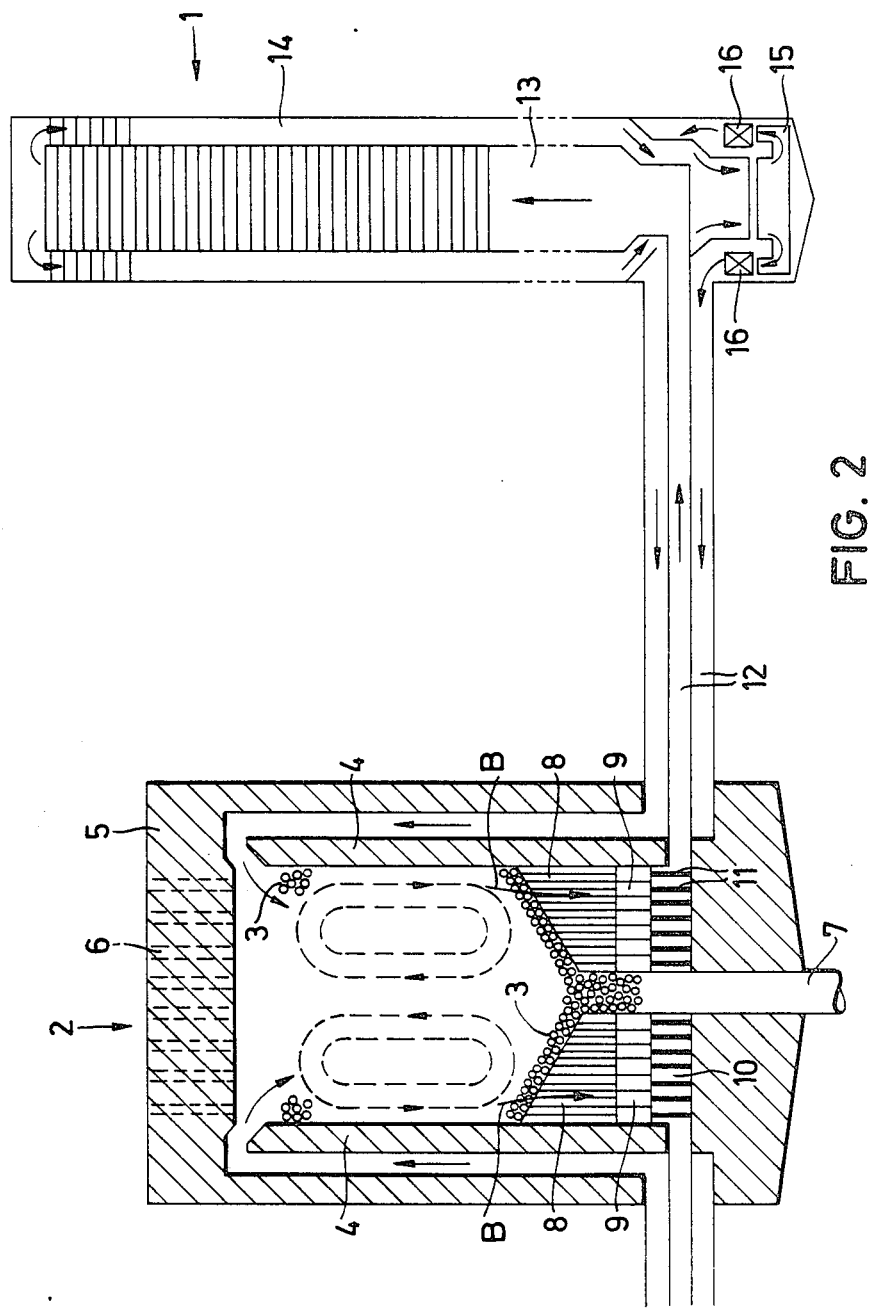
FIG. 2 is similar to FIG. 1, but showing a reactor with an economiser which is part of a first economiser tube packet arranged in a descending cold gas annular space and showing the reactor after the coolant gas blowers have failed or been shut off.

The steam generator 1, which is mounted separately from the reactor 2 and is connected to it by concentrically arranged line 12, consist basically of a long, cylindrical hot gas chamber 13, which is concentrically surrounded by a cold gas annular space 14. In the example of FIG. 1, the units for economiser, reheat superheater and evaporator are mounted in the hot gas space, as will be described in detail in connection with FIGS. 3 and 4. In the example of FIG. 2, an economiser I is disposed in the upper part of the cold gas annular space 14.

The hot gas coming from the reactor is supplied to the bottom of the hot gas space and, after passing through the heat exchangers, arrives at the top into the cold gas annular space where, in the example of FIG. 2, it then passes through the economiser I, which in the example shown in FIG. 1, is also housed in the central hot gas space 13. From the lower part of the cold gas annular space 14, the gas passes into radial blowers 15, which feed it through the outer, concentric line 12, which is provided for cold gas, to the reactor 2. The gas enters the lower end of the reactor at the outside of the reflector wall 4, where the gas is conducted upwards and eventually into the reactor core above the bed fo fuel elements. Thence, the gas travels through the bed from the cold, i.e. upper end to the hot, lower end and passes into the coolant gas slits 8, whence it is supplied through the coolant gas ducts 9 to the hot gas collector plenum 10. From this plenum, it is supplied through the inner concentric line 12, which is designed for the hot gas supply, back into the steam generator, entering it at the lower part of the hot gas space 13. This circulation of the coolant gas is illustrated in FIG. 1 by the arrows, not referenced. An annular arrow A, provided in the vicinity of radial blowers 15, symbolises the rotational movement of the radial blowers 15. FIG. 1 therefore represents the normal operating condition in respect of the gas circulation.

If the blowers 15 now fail in a fault condition or if they are shut down due to operational requirements, then on account of the arrangement according to this invention, in which at least a portion of the heat exchange units are situated above the core level, no special measures are necessary, and in particular valves 16 disposed in the vicinity of the radial blowers 15 do not need to be closed. The coolant gas circulation arising in this stage, i.e. when the radial blowers 15 are stopped, is illustrated in FIG. 2 by the arrows, also not referenced, and represents, as the following explanations show, a superimposition of two natural circulations based upon convection, which positively amplify each other in a surprising manner and produce their effects in an extraordinarily advantageous way. Thus, a natural convection flow is formed in the reactor core, as illustrated by the broken circulating arrows in this region in FIG. 2. The gas here circulates inside the reactor core in such a way that it ascends in the central region of the bed and thus transports heat from the hot to the cold end of the bed. At the upper, cold end of the bed, the gas then flows radially outwards to the cold reflector, to descend while being cooled along the inner surface of the reflector and thence to flow radially back to the centre at the lower end.

Now on account of the relative position of at least a portion of the heat exchangers with respect to the reactor core level, an "external" natural circulation, which is based upon the "chimney effect" of the steam generator column, is now superimposed upon the above flow. Since, as already mentioned, the valves 16 can be left in the open setting even in the event of a fault case, or are only throttled sufficiently far as is necessary for maintaining a desired temperature level for the removal of decay heat, this chimney effect ensures, that from the lower outer regions of the "internal" natural circulation a partial gas flow (indicated by the arrows B in FIG. 2) passes through the coolant gas slits 8, via the coolant gas ducts 9 into the hot gas collector plenum 10 and thence via the inner concentric line, which also conducts hot gas in operation, and so into the steam generator 1. In the latter, the gas then follows the same path as was previously described in connection with the explanation of FIG. 1 for normal operation, and finally arrives once again in the reactor core above the bed.

In FIG. 2, illustrating this condition, an expecially advantageous arrangement for the lowest possible form of construction is shown for the steam generator, in which a part of the heat exchange units, in this case one economiser I, is housed in the upper part of the cold gas annular space 14. It should be expressly emphasized at this point that both the preferred examples shown here for steam generators, achieve the advantages aimed at by this invention, and that only for the purpose of simplifying the drawings is the higher steam generator construction shown in FIG. 1 for the normal operating condition and the lower form of construction in FIG. 2.

Figure 3:
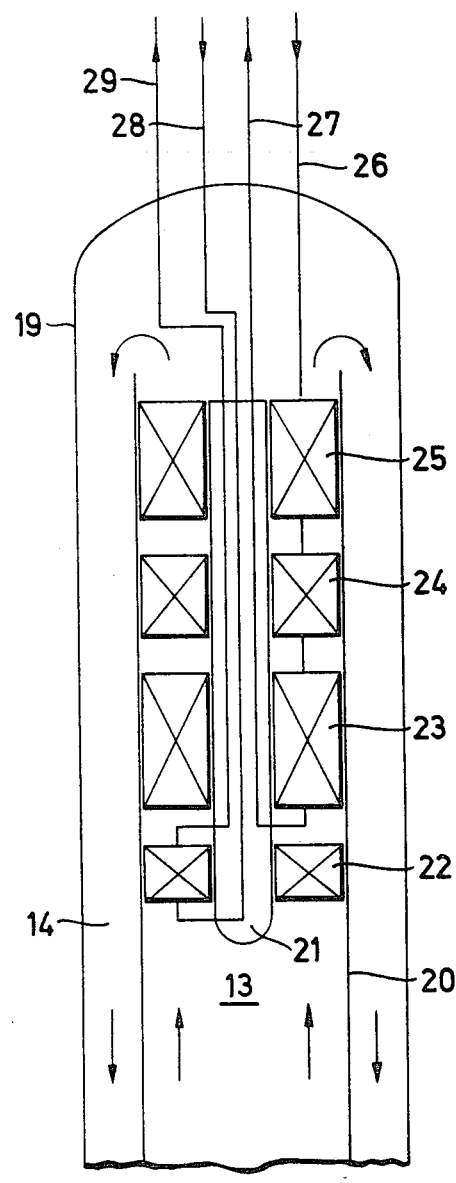
FIG. 3 shows details of the arrangement of a tube packet of a steam generator in the reactor of FIG. 1.
Figure 4:
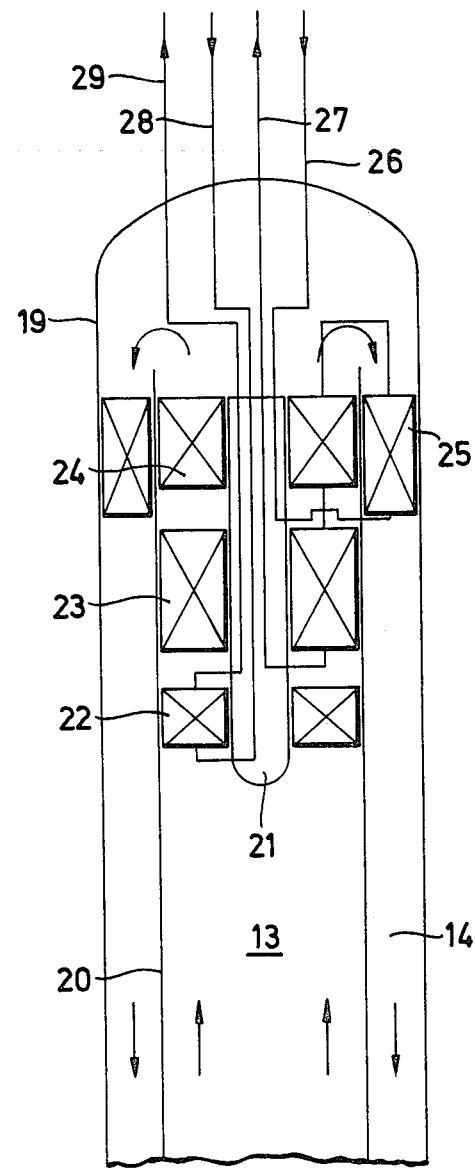
FIG. 4 shows details of the arrangement of tube packets of a steam generator in the reactor of FIG. 2; and, FIG. 5 shows two blocks (monoblocks) extending radially throughout the entire reflector wall thickness, as used in both the examples of the reactors for the composition of the side reflector.

The circuit arrangements and housing of the heat exchange units in the examples of the steam generator of FIGS. 1 and 2 are shown diagrammatically in detail in FIGS. 3 and 4 respectively. Because of the previously detailed explanation of the gas circulation and of the functions of the heat exchange units used, which are well-known to the skilled person, a detailed description of the heat exchange can be dispensed with and the components designated with reference numerals given in FIGS. 3 and 4 can be briefly described below. Thus, in a pressure vessel 19 of the steam generator, a cylindrical steam generator skirt 20 is disposed concentrically, resulting in the inner hot gas space 13 and the cold gas annular space 14 surrounding it. To ensure uniform distribution of the ascending hot gas, a concentric displacement tube 21 is disposed in each hot gas space 13. This tube extends downwards to below the lowest heat exchange unit, namely to below a reheat superheater 22. Like this reheat superheater 22, the other heat exchange units situated above the reheat superheater 22 are arranged concentrically around the displacement tube 21. Thus, above the reheat superheater 22, an evaporator and superheater 23 are disposed, and above the latter an economiser (II) 24. The economiser (I) 25 is next above the economiser (II) 24 in the example of FIG. 3, whereas in the example of FIG. 4, which illustrates the evaporator shown in FIG. 2, the economiser (I) 25 is situated at the same level as the economiser (II) 24, but surrounding the latter in the cold gas annular space 14. Feed water passes through feed lines 26 into the economiser (I) 25, then follows the pipe paths shown in FIGS. 3 and 4 to the evaporator and superheater 23, from which live steam leaves through lines 27. Lines 28 and 29 represent the inlet and outlet respectively for the reheat superheater.

The explanation of the operation of the reactor according to this invention, wherein because of the chimney effect a natural circulation without reversal of direction of flow of the coolant gas takes place when the blowers are shut down, makes it clear that, when shut-down occurs, whether because of intentional operating measures or due to a fault, the decay heat can be conducted away without difficulties and without special measures. The sole measure which may be necessary consists in a throttling of the valves 16 associated with the blowers 15, since it is not intended that a suficiently strong natural convection shall be excited by the steam generators through the "external" natural circulation for the entire cross-section in the reactor core to be traversed by gas in a downward direction. This would in many cases imply an undesired cooling of the reactor core, which must be avoided for the shut-down procedure contained by the Applicant in the already-mentioned proposals (British specification No. 1,435,062 and German specifications Nos. 2,264,947 and 2,265,032). It is therefore preferred that the external natural convection circuit through the heat exchangers shall be throttled in such a manner that it flows only through the external wall of the reactor core and thus keeps it cool, without destroying the "internal" natural circulation. The transportation of heat from the central region of the core into the outer wall is then effected by the convection circuit which circulates within the core. This will adjust itself automatically to the temperature difference between the central region and the outer wall according to the change with time of the local temperature distribution, the temperature in the outer regions being influenced substantially by the "outer" convection circuit produced in the steam generator.

As already mentioned, a form of construction of the reflector wall of blocks is especially suitable for the invention, as already described in our earlier German Application No. P 25 43 275, a preferred embodiment of which is shown in FIG. 5 by the example of two adjacently situated blocks 30. Here, the inner and outer end faces of all blocks, disposed alongside and above one another, constitute the preferably cylindrical inner and outer surfaces respectively of the side reflector, which are concentric with each other. This is achieved by each block 30 having the form of a "piece of cake", i.e. a circular sector, with a cut-away apex. The upper and lower faces of each block are in parallel planes.

Each block 30 is equipped at its end inner face with two mutually perpendicular sets of joints 31 and 32, the vertically extending joints 32 being wider than the horizontal joints 31, which produces, amongst other things, in the reflector region, which is especially strongly heated by the gamma flux and neutron scatter, a bypass flow of the coolant gas with a cooling effect for this region.

In the example illustrated, the joints have a pitch resulting in individual cross-sections of $40 \times 40$ mm tending to reduce stresses. The influence of the neutrons on the structure of the graphite decreases by a factor of 10 at a depth of only 30 cm, so that it appears sufficient to choose a joint depth of 20 to 30 cm. If, nevertheless, the stresses at the base of the joints become too large during the life of the reactor, the joints determine not merely the positions but also the planes for further growth of the cracks. By the lattice of preferably 40×40 mm, moreover, assurance is also provided that even if breaking-off should occur the resultant pieces will not prevent removal of the fuel element spheres, i.e. the extract duct will not become blocked, since the pieces will have smaller dimensions than the spherical fuel elements.

The form of the inner face of the blocks 30 is, of course, not limited to the example of FIG. 5.

I claim:

1. In a gas-cooled, graphite-moderated high temperature nuclear reactor comprising a pressure vessel, a reactor core comprising fuel elements in said pressure vessel, graphite components in said pressure vessel, and a primary coolant gas circuit including a steam generator and coolant gas blowers, the improvement wherein said steam generator is disposed outside said pressure vessel and said steam generator includes a heat exchanger and means mounting said heat exchanger with at least a portion of said heat exchanger located at a level above the level of said reactor core, said primary coolant gas circuit including flow passage means for conveying the primary coolant gas between the reactor core and the heat exchanger, said flow passage means including a first flow passage located below the lower end of said reactor and below the lower end of said heat exchanger for conveying the hot coolant gases from the lower end of said reactor core to the lower end of said heat exchanger, an upwardly extending second flow passage connected at the lower end thereof to said first flow passage and containing at least a portion of said heat exchanger for conducting the hot coolant gases from said reactor core upwardly over said heat exchanger to the upper end of the passage located above the top of the reactor core with the upper end of the heat exchanger in said second flow passage located above the upper end of the reactor core, an upwardly arranged third flow passage for receiving the coolant gas after its passage through said second flow passage for conveying the coolant gas downwardly to a location below said heat exchanger and below the lower end of said core, and a fourth flow passageway for conveying the coolant gas to below the lower end of said reactor core; and a fifth flow passage located around said reactor core and connected at its lower end to said fourth flow passage for conveying the coolant gas upwardly to a location above said reactor core and for introducing the coolant gas into the reactor core for downward flow therethrough, said flow passage means arranged to generate a natural convection flow from said reactor core to said heat exchanger and back to said reactor core and for avoiding the reversal of flow direction and ensuring a sufficient cooling gas flow after reactor core shutdown or failure of the blowers.

2. A nuclear reactor as claimed in claim 1, wherein said fuel elements are spherical and said coolant gas is helium.

3. A nuclear reactor as claimed in claim 1, wherein said heat exchanger includes a first economiser tube packet and said third flow passage defining an externally situated annular space within said steam generator and around said second flow passage, said blowers being adapted to flow said coolant gas downwards through said annular space when said reactor is in operation, and means mounting said first economiser tube packet in said annular space.

4. A nuclear reactor as claimed in claim 1, further comprising a side reflector of said core within said pressure vessel, said side reflector comprising blocks, said blocks including inner end faces and means defining recesses in said inner end faces in those of said blocks which are disposed in at least the upper region of said reactor core.

5. A nuclear reactor as claimed in claim 4, wherein said blocks are of graphite and said blocks extend continuously radially through the entire thickness of said side reflector.

6. A nuclear reactor as claimed in claim 4, wherein said recesses consist of sets of joints.

7. A nuclear reactor as claimed in claim 4, in which said recesses consist of a lattice of vertically and horizontally extending rectilinear sets of joints.

8. A nuclear reactor as claimed in claim 6, in which said joints of each of said sets are disposed at a uniform pitch.

9. A nuclear reactor as claimed in claim 6, in which said vertically extending joints in at least said upper region of said reactor core have a width or depth greater than that of said horizontally extending joints.

10. A nuclear reactor as claimed in claim 6, wherein said fuel elements are spherical and said vertically extending joints have a width less than the diameter of said fuel elements.

11. A nuclear reactor as claimed in claim 6, wherein a discontinuity lattice is superimposed upon said sets of joints.

12. A nuclear reactor as claimed in claim 6, in which at said inner end face of each of said blocks there is a discontinuity point comprising means defining a truncated conical depression having a depth less than the depth of said joint.

13. A nuclear reactor as claimed in claim 6, in which the depth of said joints is in the range of from about 20 mm to about 200 mm.

14. A nuclear reactor as claimed in claim 1, wherein said first flow passageway being generally horizontal and extending directly from below the lower end of said reactor core to below the lower end of said heat generator within said second flow passage.

15. A nuclear reactor as claimed in claim 14, wherein said second flow passage is located within said third flow passage so that the coolant gas traverses the entire vertical height of said second flow passage before flowing into the upper end of said third flow passage wherein the coolant gas flows downwardly around said second flow passage to the lower end of said third flow passage located below the lower end of said flow passage.

* * * * *